(12) United States Patent
Glasgow

(10) Patent No.: US 6,211,652 B1
(45) Date of Patent: Apr. 3, 2001

(54) DISCHARGE PROTECTION APPARATUS FOR A BATTERY-POWERED DEVICE AND A METHOD OF PREVENTING OVERDISCHARGE OF A BATTERY

(75) Inventor: Kevin L. Glasgow, Campbellsport, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 09/499,018

(22) Filed: Feb. 4, 2000

(51) Int. Cl.[7] ........................... H01M 10/44; H01M 10/46
(52) U.S. Cl. ................................................. 320/136
(58) Field of Search .................................. 320/134, 136, 320/127, 13 J

(56) References Cited

U.S. PATENT DOCUMENTS

| | | |
|---|---|---|
| 4,609,860 | 9/1986 | Fasen . |
| 4,935,316 | 6/1990 | Redey . |
| 5,442,794 | 8/1995 | Wisor et al. . |
| 5,477,124 | 12/1995 | Tamai . |
| 5,623,193 | 4/1997 | Lang et al. . |
| 5,637,980 | 6/1997 | Wu . |
| 5,675,258 | 10/1997 | Kadouchi et al. . |
| 5,729,061 | 3/1998 | Narita . |
| 5,738,955 | 4/1998 | Gardner et al. . |
| 5,896,025 | 4/1999 | Yamaguchi et al. . |
| 5,929,604 | 7/1999 | Irviin . |
| 5,936,384 | 8/1999 | Fujiwara et al. . |
| 6,064,176 | * 5/2000 | Odaka .................................. 320/106 |
| 6,081,101 | * 6/2000 | Yang .................................... 320/154 |

* cited by examiner

Primary Examiner—Edward H. Tso
(74) Attorney, Agent, or Firm—Michael Best & Friedrich LLP

(57) ABSTRACT

A deep discharge protection circuit designed to be directly integrated into battery-operated devices having a battery, a power switch that controls the battery, and a load connected to the power switch. The protection circuit includes a thyristor or similar current-controlled, latched switch that has a control gate or input. The thyristor is coupled in series with the load. A capacitor or similar electric energy storage device is coupled to the load and to the control input of the thyristor. A resistor is coupled to the load and to the control input of the thyristor, in parallel to the capacitor. When the power switch is turned on, it delivers a current pulse to the capacitor. The capacitor briefly shorts and delivers a trigger current to the control input of the thyristor. The trigger current causes the thyristor to become conductive, which allows current to travel from the battery through the load to ground. The thyristor remains conductive so long as the current through the load remains at or above the holding current of the thyristor. If the current through the load drops below the holding current (as a result of the battery discharging), the thyristor turns off and remains off even if the battery experiences an open circuit recovery.

22 Claims, 1 Drawing Sheet

DISCHARGE PROTECTION APPARATUS FOR A BATTERY-POWERED DEVICE AND A METHOD OF PREVENTING OVERDISCHARGE OF A BATTERY

BACKGROUND OF THE INVENTION

The present invention relates to a discharge protection circuit for battery-operated devices such as portable electric lights, electric tools, and the like. More particularly, the invention relates to a discharge protection circuit of relatively simple design that protects re-chargeable batteries from damage caused by overdischarging.

Rechargeable batteries are used to power a wide variety of battery-operated or "cordless" electric devices. Ideally, a rechargeable battery could be charged and discharged an infinite number of times. In practice, batteries have a limited useful life, which can be further shortened if the batteries are damaged. Overdischarging is a significant cause of damage to rechargeable batteries. Typically, overdischarging occurs as a result of the electric device being inadvertently left on. When this happens, the battery (or batteries) in the device continues to discharge until the voltage of the battery drops to a zero or near zero value. Allowing the voltage to drop to such a low value typically causes cell reversal and damage to the battery. Often, the damage is so severe that the battery must be replaced. At a minimum, the battery's ability to fully recharge is affected.

Devices that prevent overdischarge are available. Many available devices attempt to solve the problem of overdischarge by monitoring the voltage level of the battery and disconnecting a battery from its load once the battery has discharged to a predetermined level. One difficulty with this type of design is that a discharged battery's open circuit voltage returns to a level that is nearly the same as a fully charged battery ("open circuit recovery"). Thus, in cordless devices equipped with voltage-monitoring protection devices, a battery will continue to discharge after open circuit recovery occurs, further depleting the battery. Using voltage hysteresis in a voltage monitoring circuit does not solve this problem.

Some protection devices provide a latching function to prevent discharge of an already depleted battery. However, most methods and components used to provide a latching function are complex and costly. Expensive protection devices are, in general, not suitable for cordless devices that sell at relatively low prices. Yet, if inexpensive and simple protection devices were available, protection devices could be fitted in many inexpensive cordless devices and significant cost savings could be realized for nearly all cordless devices.

SUMMARY OF THE INVENTION

Accordingly, the present invention provides a discharge protection circuit that is capable of preventing a battery from discharging to an undesirably low level. The discharge protection circuit is relatively simple and may be constructed with relatively inexpensive components. The circuit is designed to be directly integrated into battery-operated devices having a battery, a power switch that controls the battery, and a load connected to the power switch. The protection circuit includes a thyristor or similar current-controlled, latched switch that has a control gate or input. The thyristor is coupled in series with the load. A capacitor or similar electric energy storage device is coupled to the load and to the control input of the thyristor. A resistor is coupled to the load and to the control input of the thyristor, in parallel to the capacitor.

When the power switch is turned on, it delivers a current pulse to the capacitor. In response to the pulse, the capacitor shorts and provides a trigger pulse to the control input of the thyristor. The trigger pulse causes the thyristor to become conductive, which allows current to travel from the battery through the load to ground. The thyristor remains conductive so long as the current through the load remains at or above the holding current of the thyristor. If the current through the load drops below the holding current (as a result of the battery discharging), the thyristor turns off and remains off even if the battery experiences an open circuit recovery.

As current flows through the load, the capacitor charges. When the load current is shut off, such as when the power switch is shut off, the capacitor discharges through the resistor allowing the circuit to cycle as fast as the power switch can be cycled.

In addition to using a thyristor, the invention may be implemented with alternative current-controlled, latched switches such as SCRs or SIDAC™ devices.

As is apparent from the above, it is an advantage of the present invention to provide a simplified, current-dependent discharge protection circuit that does not employ microprocessor or other expensive circuit components. Other features and advantages of the present invention will become apparent by consideration of the detailed description and accompanying drawings.

DETAILED DESCRIPTION

Figure 1:
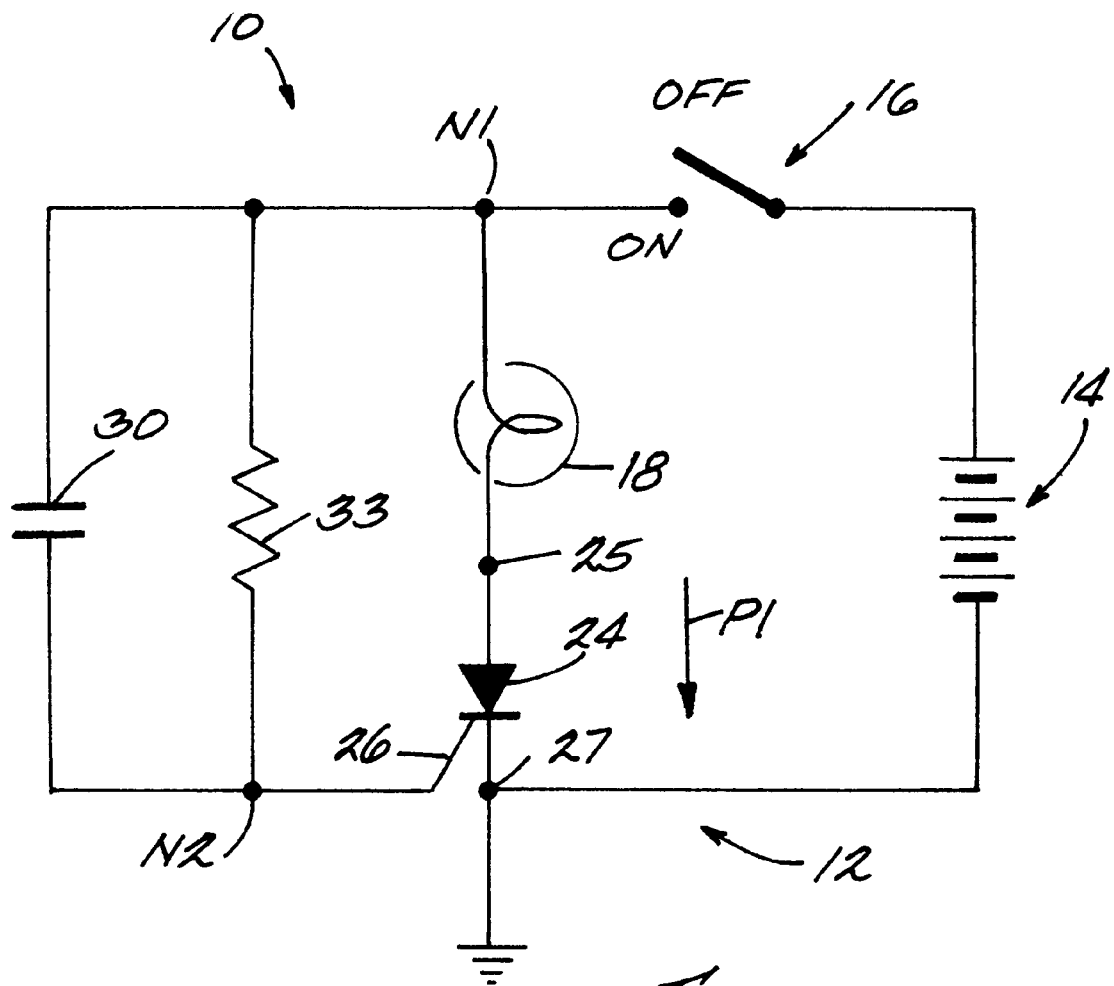
FIG. 1 is a circuit diagram of a discharge protection circuit embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates a discharge protection circuit 10 embodying the invention integrated into a battery-powered device 12 (shown schematically). The battery-powered device 12 includes a rechargeable battery 14 coupled to a power switch 16 having an ON position and an OFF position. The power switch 16 is coupled to a load 18 at a node N1. For purposes of illustration, the load 18 is shown as a lamp. However, the load 18 could be a motor, heating element, an electronic circuit (such as those used in portable games, phones, or other devices), or some other electric device, as would be apparent to persons of ordinary skill in the art.

A thyristor 24, such as a silicon controller rectifier (SCR), is coupled in series to the load 18. The thyristor 24 has an anode or input node 25, a control gate or input 26, and a cathode or output node 27. As is known in the art, the thyristor 24 is a current-controlled, latched switch. Current of sufficient magnitude (sometimes referred to as the "trigger" or "gate" current) applied to control input 26 causes the thyristor 24 to latch on. That is, a current path P1 from the input node 25 to the output node 27 becomes conductive. The path P1 remains conductive so long as there is current of a sufficient magnitude flowing through the path. This is true even if the thyristor trigger current to the control input 26 drops to zero. The minimum current in the path P1 needed to maintain the path P1 in a conductive state is known as the "holding current." It is preferred that the thyristor 24 have a holding current of about 150 mA to about 500 mA, although higher current devices could be used depending on the type of load 18 to which the battery 14 is coupled.

An electric energy storage device or capacitor 30 is coupled to the load 18 and the control input 26 at a node N2. An electric energy consumption device or resistor 33 is coupled in parallel to the capacitor 30.

When the power switch 16 is turned to the ON position, a current pulse is delivered to node N1. The current pulse causes the capacitor to act like a short and provide a trigger current to the thyristor 24. The trigger current causes the current path P1 to become conductive, which allows current to travel from the battery 14 through the load 18 to ground. As noted above, the thyristor 24 remains conductive so long as the current through the load 18 (the "load current") remains at or above the holding current of the thyristor. If the current through the load 18 drops below the holding current (as a result of the battery 14 discharging), the thyristor 24 turns off and remains off even if the battery experiences an open circuit recovery. The power switch 16 must be cycled before further discharge can occur.

The initial current pulse caused by switching the power switch 16 to the ON position is followed by DC current at node N1. This current charges the capacitor 30. When the power switch is turned to the OFF position, the capacitor 30 discharges through the resistor 33. This enables the thyristor 24 to be re-triggered as fast as the power switch can be cycled.

Figure 2:
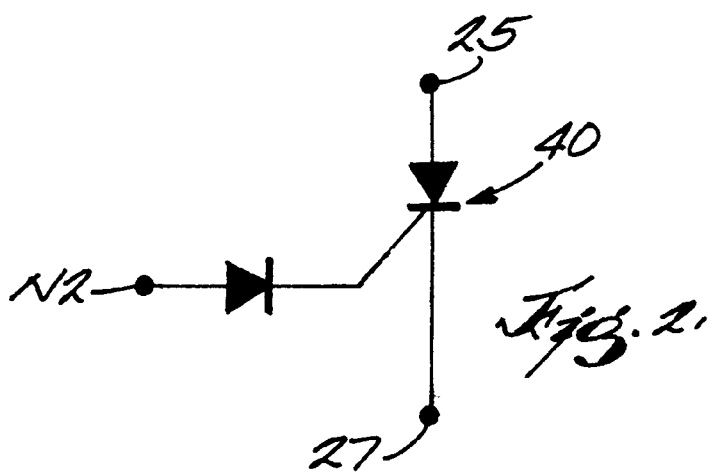
FIG. 2 is a circuit diagram of a current-controlled, latched switch that may be substituted for the thyristor shown in the circuit of FIG. 1.

Preferably, the invention is implemented with a SIDACtor™ device 40 (FIG. 2) replacing the thyristor 24. SIDACtor™ devices are available from Teccor Electronics, Inc. The thyristor 24 and SIDACtor™ device 40 are both current-controlled, latched switches in the sense that a control current causes each to turn on and remain on even if the control current drops to zero so long as the current flowing through the device remains at or above the device's holding current. It is believed that any similar device could be readily substituted for the thyristor, SCR, and SIDACtor™ devices described herein. SIDACtor™ devices are a type of electrical crowbar.

It is preferred that the capacitor 30 have a capacitance of about 10 $\mu$F and that the resistor 33 have a resistance of about 100 k$\Omega$, when the circuit 10 is designed to have a holding current in the range of about 150 mA to about 500 mA. Generally, the value of the capacitor 30 is chosen such that the capacitor has sufficient capacitance to absorb the switch bounce of the power switch 16. The value of the resistor 33 is chosen such that it is high enough to prevent self-discharge of the battery 14, yet low enough to reset the capacitor 30.

One advantage of the present invention is that it provides a current dependent, rather than voltage dependent solution to overdischarging. Because the circuit 10 relies on the level of the load current through the path P1 rather than monitoring voltage, the circuit may be used in devices with different types of batteries. The embodiments shown are suitable for use in devices powered by 9.6 to 18 volt batteries (or battery packs). Voltage dependent protection devices are not, in general, capable of being used with more than one type of battery.

As can be seen from the above, the present invention provides a simple deep discharge protection circuit for battery-powered devices. Various features and advantages of the invention are set forth in the following claims.

What is claimed is:

1. A discharge protection apparatus for a battery-powered device having a load, the apparatus comprising:
   a thyristor having a control input and coupled in series with the load;
   a capacitor coupled to the load and to the control input of the thyristor; and
   a resistor coupled to the load and to the control input of the thyristor.

2. A discharge protection apparatus as claimed in claim 1, wherein the thyristor has a holding current and the load has a load current and wherein the thyristor turns off when the load current drops below the holding current.

3. A discharge protection circuit as claimed in claim 1, wherein the thyristor has a holding current between about 150 mA and about 500 mA.

4. A discharge protection apparatus for a battery-powered device having a battery coupled in series to a power switch and a load coupled to the power switch, the apparatus comprising:
   a current-controlled, latched switch having a control input and coupled in series to the load;
   an electric energy storage device coupled to the load and to the control input of the current-controlled, latched switch; and
   an electric energy consumption device coupled in parallel to the electric energy storage device.

5. A discharge protection apparatus as in claim 4, wherein the current-controlled, latched switch is a thyristor.

6. A discharge protection apparatus as claimed in claim 4, wherein the current-controlled, latched switch is an SCR.

7. A discharge protection apparatus as claimed in claim 4, wherein the current-controlled, latched switch is a crowbar device.

8. A discharge protection apparatus as in claim 7, wherein the crowbar device has a holding current of about 150 mA to about 500 mA.

9. A discharge protection circuit as claimed in claim 4, wherein the current-controlled, latched switch has a holding current between about 150 mA and about 500 mA.

10. A discharge protection apparatus for a battery-powered device having a battery coupled in series to a power switch and a load coupled to the power switch, the apparatus comprising:
    means for providing current latching having a control input and coupled in series to the load;
    means for storing electric energy coupled to the load and to the control input of the means for providing current latching; and
    means for consuming electric energy coupled in parallel to the means for storing electric energy.

11. A discharge protection apparatus as claimed in claim 10, wherein the means for providing current latching has a holding current and the load has a load current and wherein the means for providing current latching turns off when the load current drops below the holding current.

12. A discharge protection circuit as claimed in claim 10, wherein the means for providing current latching has a holding current between about 150 mA and about 500 mA.

13. A discharge protection apparatus as in claim 10, wherein the means for providing current latching is a thyristor.

14. A discharge protection apparatus as claimed in claim 10, wherein the means for providing current latching is an SCR.

15. A discharge protection apparatus as claimed in claim 10, wherein the means for providing current latching is a crowbar device.

16. A discharge protection apparatus as in claim 15, wherein the crowbar device has a holding current of about 150 mA to about 500 mA.

17. A method of preventing overdischarge of a battery connected to a power switch having an on position and an off position, the method comprising providing a current latch having a conductive state and non-conductive state and a control input and coupling the current latch in series to a load;

coupling an electric energy storage device to the power switch and to the control input of the current latch;

coupling an electric energy consumption device to the electric energy storage device to discharge the electric energy storage device when the power switch is in the off position; and providing a trigger current from the electric energy storage device to the current latch.

18. A method as claimed in claim 17, further comprising changing the state of the current latch from the conductive state to the non-conductive state when the current through the load drops below a holding current of the current latch.

19. A method as claimed in claim 18, wherein the holding current of the current latch is between about 150 mA to about 500 mA.

20. A method as claimed in claim 18, wherein the load is a lamp.

21. A method as claimed in claim 18, wherein the load is a motor.

22. A method as claimed in claim 18, wherein the load is an electronic circuit.

\* \* \* \* \*